United States Patent
Yamanoi et al.

(10) Patent No.: US 10,210,407 B2
(45) Date of Patent: Feb. 19, 2019

(54) TRAFFIC SIGNAL DETECTION DEVICE AND TRAFFIC SIGNAL DETECTION METHOD

(71) Applicant: Nissan Motor Co., Ltd., Yokohama-shi, Kanagawa (JP)

(72) Inventors: Daiki Yamanoi, Kanagawa (JP); Haruo Matsuo, Kanagawa (JP); Takahiko Oki, Kanagawa (JP); Akira Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/580,550

(22) PCT Filed: Jun. 9, 2015

(86) PCT No.: PCT/JP2015/066615
§ 371 (c)(1),
(2) Date: Dec. 7, 2017

(87) PCT Pub. No.: WO2016/199225
PCT Pub. Date: Dec. 15, 2016

(65) Prior Publication Data
US 2018/0349717 A1 Dec. 6, 2018

(51) Int. Cl.
*G06K 9/00* (2006.01)
*G06F 17/30* (2006.01)
*G06K 9/32* (2006.01)

(52) U.S. Cl.
CPC ..... *G06K 9/00825* (2013.01); *G06F 17/30241* (2013.01); *G06K 9/3241* (2013.01)

(58) Field of Classification Search
CPC ...... A63F 13/327; A63F 13/213; A63F 13/25; A63F 13/32; A63F 13/332; A63F 13/335;
(Continued)

(56) References Cited

U.S. PATENT DOCUMENTS

2009/0303077 A1 12/2009 Onome et al.
2012/0288138 A1 11/2012 Zeng
(Continued)

FOREIGN PATENT DOCUMENTS

JP 2005347945 A 12/2005
JP 2007241469 A 9/2007
(Continued)

OTHER PUBLICATIONS

Fairfield, Nathaniel et al., "Traffic Light Mapping and Detection", 2011 IEEE International Conference on Robotics and Automation, Shanghai International Conference Center, May 9-13, 2011, Shanghai, China, pp. 5421-5426.

*Primary Examiner* — Duy M Dang
(74) *Attorney, Agent, or Firm* — Young Basile Hanlon & MacFarlane, P.C.

(57) ABSTRACT

A traffic signal detection device includes a narrow-angle camera, a wide-angle camera having an angle of view wider than the narrow-angle camera, and a traffic signal detector configured to detect a traffic signal from at least any of a narrow-angle image captured by the narrow-angle camera and a wide-angle image captured by the wide-angle camera. The traffic signal detector selects, as a detection result, any of a traffic signal detected from the narrow-angle image and a traffic signal detected from the wide-angle image, on the basis of a deceleration start region in which a vehicle should start deceleration, the deceleration start region calculated from a position of a traffic signal with respect to the vehicle and a speed of the vehicle in order to stop the vehicle at a stop position with respect to the traffic signal.

7 Claims, 16 Drawing Sheets

(58) Field of Classification Search
CPC .......... A63F 13/655; A63F 13/00; G06T 7/55;
G06T 3/0068; G06T 15/04; G06T 7/001;
G06T 2207/30261; G06T 2207/30252;
G06T 7/0042; G06T 7/0022; G06T
2207/30241; G06K 9/00228; G06K
9/6202; G06K 9/6279; G06K 9/00785;
G06K 9/00791; G06K 9/00; G06K
9/00805; G06K 9/00825; G06K
99/32417; G01S 13/90; G01S 17/89;
G01C 21/3602; G06F 17/30241
See application file for complete search history.

(56) References Cited

U.S. PATENT DOCUMENTS

| | | |
|---|---|---|
| 2013/0253754 A1 | 9/2013 | Ferguson et al. |
| 2015/0012200 A1 | 1/2015 | Joshi et al. |
| 2015/0360692 A1 | 12/2015 | Ferguson et al. |

FOREIGN PATENT DOCUMENTS

| | | |
|---|---|---|
| JP | 2013045176 A | 3/2013 |
| JP | 2015518600 A | 7/2015 |
| WO | 2007102065 A1 | 9/2007 |

FIG. 9
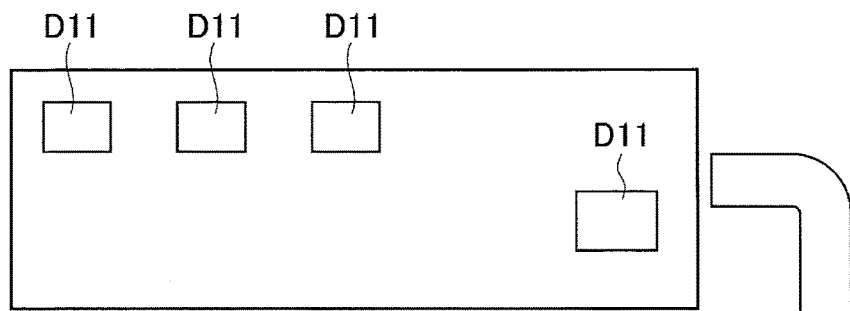
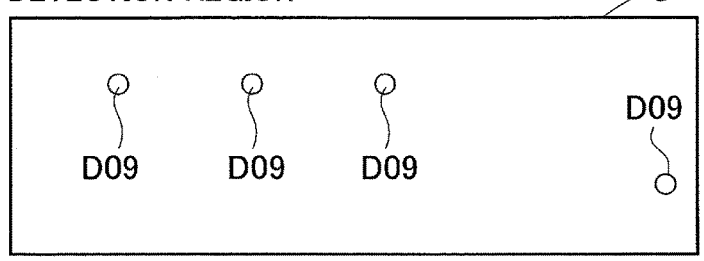
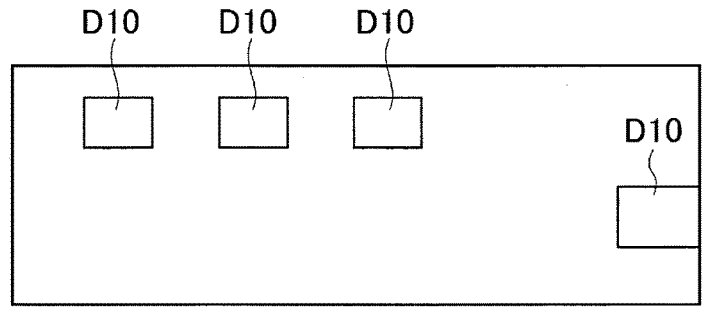

FIG. 11
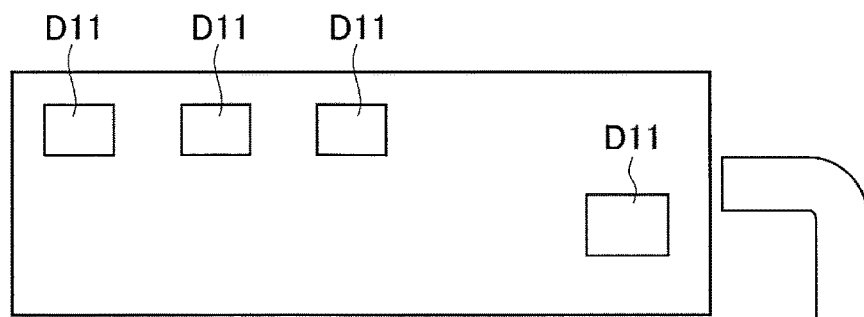
FIRST DETECTION REGION
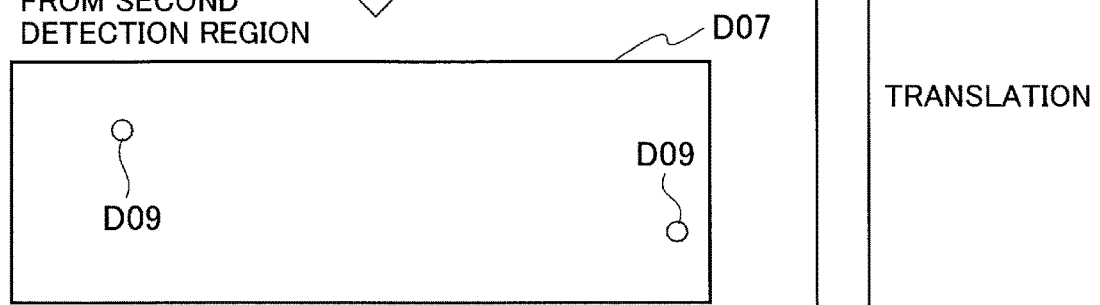
DETECTION RESULT OF LAMP CANDIDATE FROM SECOND DETECTION REGION ⇕ CHECK
TRANSLATION
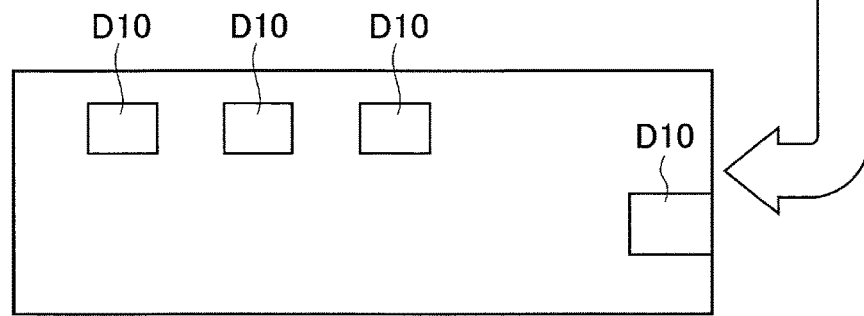
THIRD DETECTION REGION FIG. 13
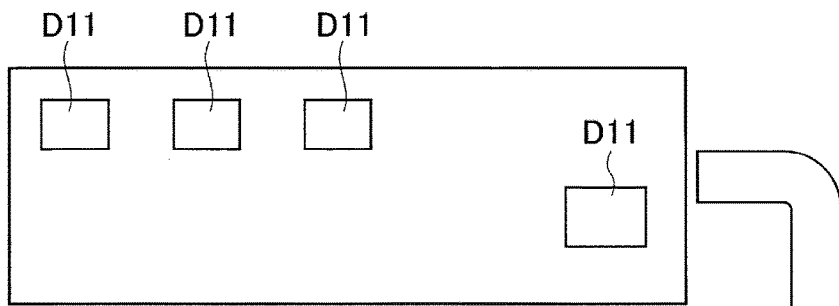
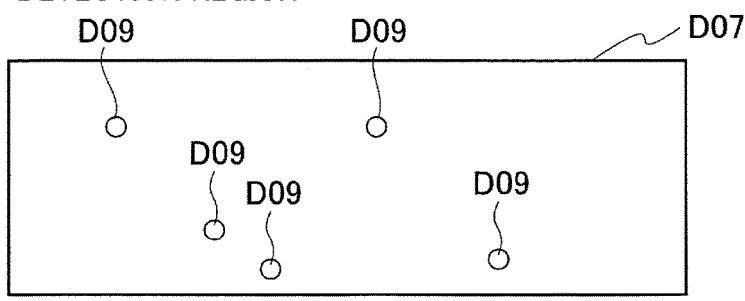
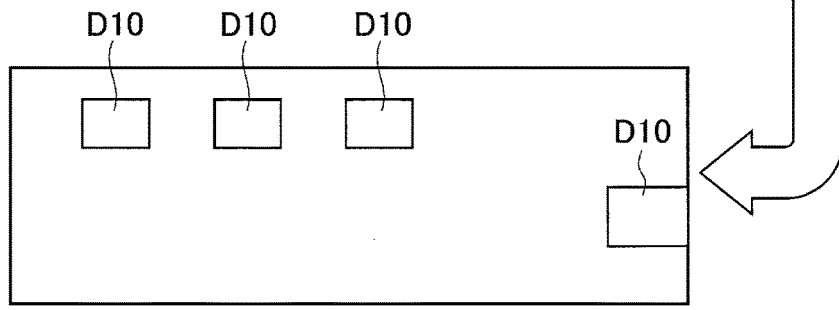

TRAFFIC SIGNAL DETECTION DEVICE AND TRAFFIC SIGNAL DETECTION METHOD

TECHNICAL FIELD

The present invention relates to a traffic signal detection device and a traffic signal detection method for detecting a traffic signal.

BACKGROUND

A device is proposed which can continuously monitor an object ahead of a vehicle by selecting a detection result based on any of a wide-angle image captured by a wide-angle camera having a wide angle of view and a narrow-angle image captured by a narrow-angle camera having a narrow angle of view (see Japanese Patent Laid-Open Publication No. 2011-121398). Such a device selects a narrow-angle image when a distance to the object exceeds a distance in which an object can be detected with a desired accuracy by a wide-angle image, and a wide-angle image when an object is out of the field of view of the narrow-angle camera.

However, for the technology described in Japanese Patent Laid-Open Publication No. 2011-121398, there is no mention of a possibility of delay of determination of vehicle control due to recognition delay time or non-recognition, etc., occurred in switching detection results. The delay of determination to stop a vehicle may require a larger deceleration.

SUMMARY

The present invention has been made in view of the above problem, and an object thereof is to provide a traffic signal detection device and a traffic signal detection method which can prevent effects on vehicle control due to delay time or non-recognition in switching of the detection results.

The traffic signal detection device considers a region in which a vehicle should start deceleration in order to stop the vehicle, and thereby switches detection results of a traffic signal by a narrow-angle camera and a wide-angle camera so as to reduce effects on the vehicle control in switching of the detection results.

DETAILED DESCRIPTION OF THE EMBODIMENTS

With reference to the drawings, embodiments of the present invention will be described. In the description of the drawings, the same or similar parts are denoted by the same or similar reference signs, and overlapping descriptions are omitted.

(Traffic Signal Detection Device)

Figure 1:
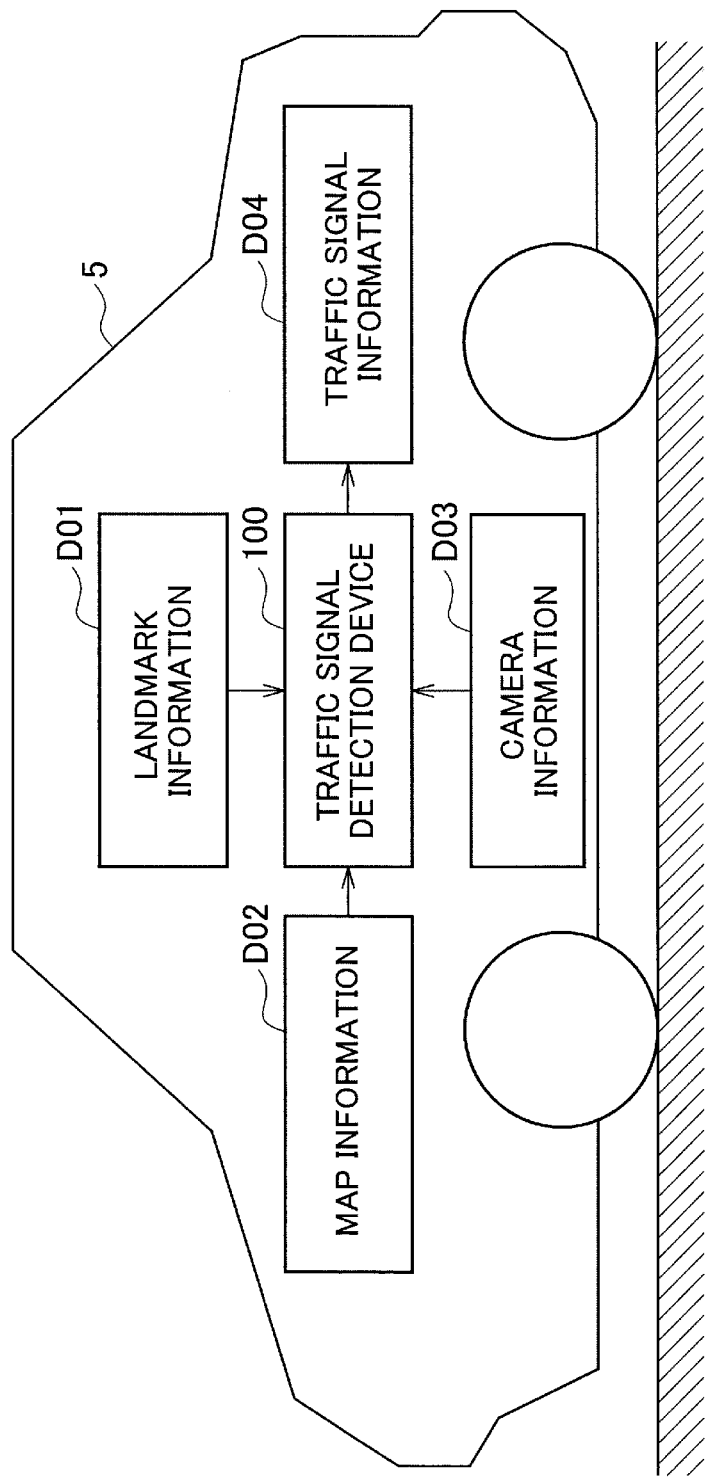
FIG. 1 is a block diagram schematically illustrating a basic configuration of a traffic signal detection device according to an embodiment of the present invention.

As shown in FIG. 1, the traffic signal detection device according to the present embodiment includes an imaging part 1 with a narrow-angle camera 11 and a wide-angle camera 12, a traffic signal detector 4 having a camera selector 2 and an image processor 3, and a vehicle speed sensor 10. The vehicle speed sensor 10 detects speed of a vehicle 5, and outputs the detected speed to the camera selector 2 as speed information Dv. The traffic signal detector 4 detects, from an image captured by the imaging part 1, a traffic signal which is installed around a road on which the vehicle 5 is travelling and exists ahead of the vehicle 5, and outputs the detected traffic signal, to the outside thereof as traffic signal information Dt which is a detection result. The vehicle 5 is, for example, an automatic driving vehicle which automatically travels along a preset travelling passage on the basis of the traffic signal information Dt and the like of the traffic signal detector 4.

The narrow-angle camera 11 and the wide-angle camera 12 are respectively mounted in the vehicle 5 to capture images ahead of the vehicle 5. Each of the narrow-angle camera 11 and the wide-angle camera 12 includes a solid-state imaging element, such as a CCD or CMOS, and outputs digital images for which image processing can be executed. The wide-angle camera 12 has an angle of view (viewing angle) wider than the narrow-angle camera 11. Thus, the wide-angle camera 12 has lower resolution capability than the narrow-angle camera 11 when imaging an object at the same distance with the same resolution. The narrow-angle camera 11 outputs a captured narrow-angle image as narrow-angle image information Dn to the traffic signal detector 4. The wide-angle camera 12 outputs a captured wide-angle image as wide-angle image information Dw to the traffic signal detector 4.

The camera selector 2 and the image processor 3 can be implemented using, for example, a microcontroller including a central processing unit (CPU), a memory, and an input/output unit. In this case, the CPU executes computer programs preinstalled in the microcontroller to configure the camera selector 2 and the image processor 3. The microcontroller may be used also as an electronic control unit (ECU) used for other control on the vehicle 5, such as automatic driving control, for example.

The image processor 3 detects a traffic signal by image processing from at least any of narrow-angle images captured by the narrow-angle camera 11 and wide-angle images captured by the wide-angle camera 12. The image processor 3 outputs, on the basis of determination of the camera selector 2, any of a traffic signal detected from the narrow-angle image and a traffic signal detected from the wide-angle image, as the traffic signal information Dt. The image processor 3 can reduce the processing load by detecting a traffic signal from any of the narrow-angle image and the wide-angle image. In this case, the image processor 3 can cause a delay time for detection when switching the narrow-angle image and the wide-angle image used for detecting a traffic signal.

The image processor 3 performs image processing for traffic signal detection on each of the narrow-angle image captured by the narrow-angle camera 11 and the wide-angle image captured by the wide-angle camera 12. For example, the image processor 3 detects, using synchronized image generation, a signal light in the traffic signal that flashes at a specific cycle based on the alternating cycle of commercial power supplies. Alternatively, the image processor 3 can detect a traffic signal using hue and shape similarity determination processing. As described above, the image processor 3 can detect a traffic signal and the color of the traffic signal using various image processing methods or a combination thereof.

Note that the image processor 3 sets not the entire region of each image indicated by the narrow-angle image information Dn and the wide-angle image information Dw, but a part of a detection region on the image and performs image processing only on the detection region, and thereby can reduce processing load and processing time for traffic signal detection. The detection region is set on the image on the basis of the positions of traffic signals estimated from map information including road shape and positions of traffic signals, positional information of the vehicle 5 and the like.

Figure 2:
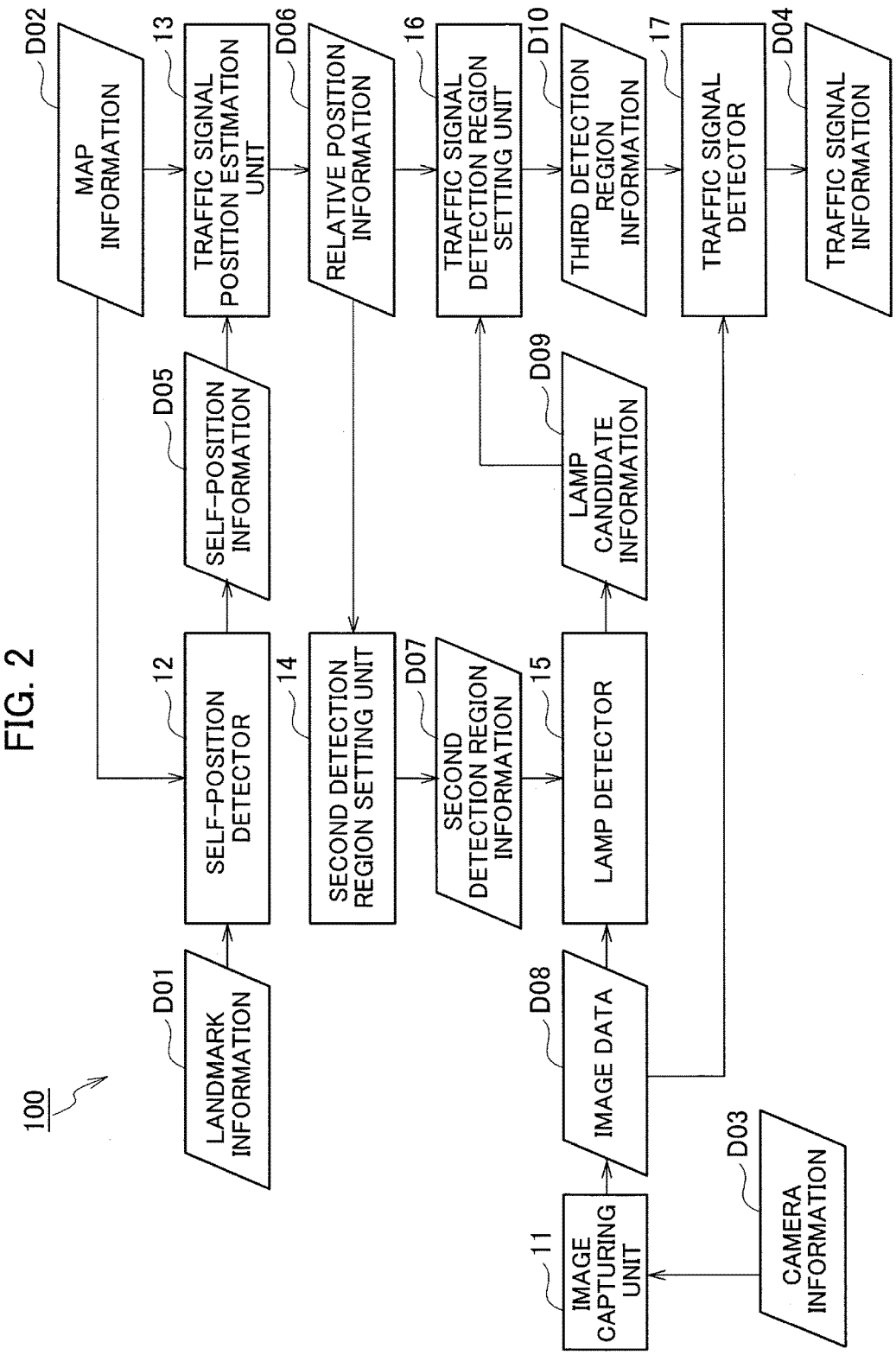
FIG. 2 is a block diagram illustrating a configuration of a traffic signal detection device according to an embodiment of the present invention and a dataflow therein.

As shown in FIG. 2, the camera selector 2 includes a detectable region calculator 21, a deceleration start region calculator 22, a switchable region calculator 23, a delay distance calculator 24, a switch region determiner 25, and a camera determiner 26. On the basis of the speed information Dv and the like, the camera selector 2 outputs to the image processor 3 selection camera information Ds for designating to the image processor 3 which any of a traffic signal detected from the narrow-angle image and a traffic signal detected from the wide-angle image is output as the traffic signal information Dt.

The detectable region calculator 21 calculates a detectable region where traffic signals could be detected on the basis of camera information Dc indicating the angles of view, vertical and horizontal angles, and resolution set to the narrow-angle camera 11 and the wide-angle camera 12, and outputs the detectable region as detectable region information D01. The detectable region calculator 21 calculates a region where the detection rate of traffic signals exceeds a predetermined threshold and a region where the traffic signal does not deviate from the angle of view, for each of the narrow-angle camera 11 and the wide-angle camera 12. The detectable region calculator 21 calculates, as a detectable region, a region where both the narrow-angle camera 11 and the wide-angle camera 12 could detect a traffic signal, from the region calculated for each of the narrow-angle camera 11 and the wide-angle camera 12.

Note that, the region where the detection rate of traffic signals exceeds the predetermined threshold is calculated by predicting the number of pixels on the images acquired by the narrow-angle camera 11 and the wide-angle camera 12 on the basis of a distance between a detection object and the vehicle 5 and then using whether or not the predicted number of pixels exceeds that of pixels to be detected, which is a threshold, in historical detection data. The region where the traffic signal does not deviate from the angle of view is calculated on the basis of deviation of the traffic signal from each optical axis of the narrow-angle camera 11 and the wide-angle camera 12 along the travelling direction of the vehicle 5.

Figure 3:
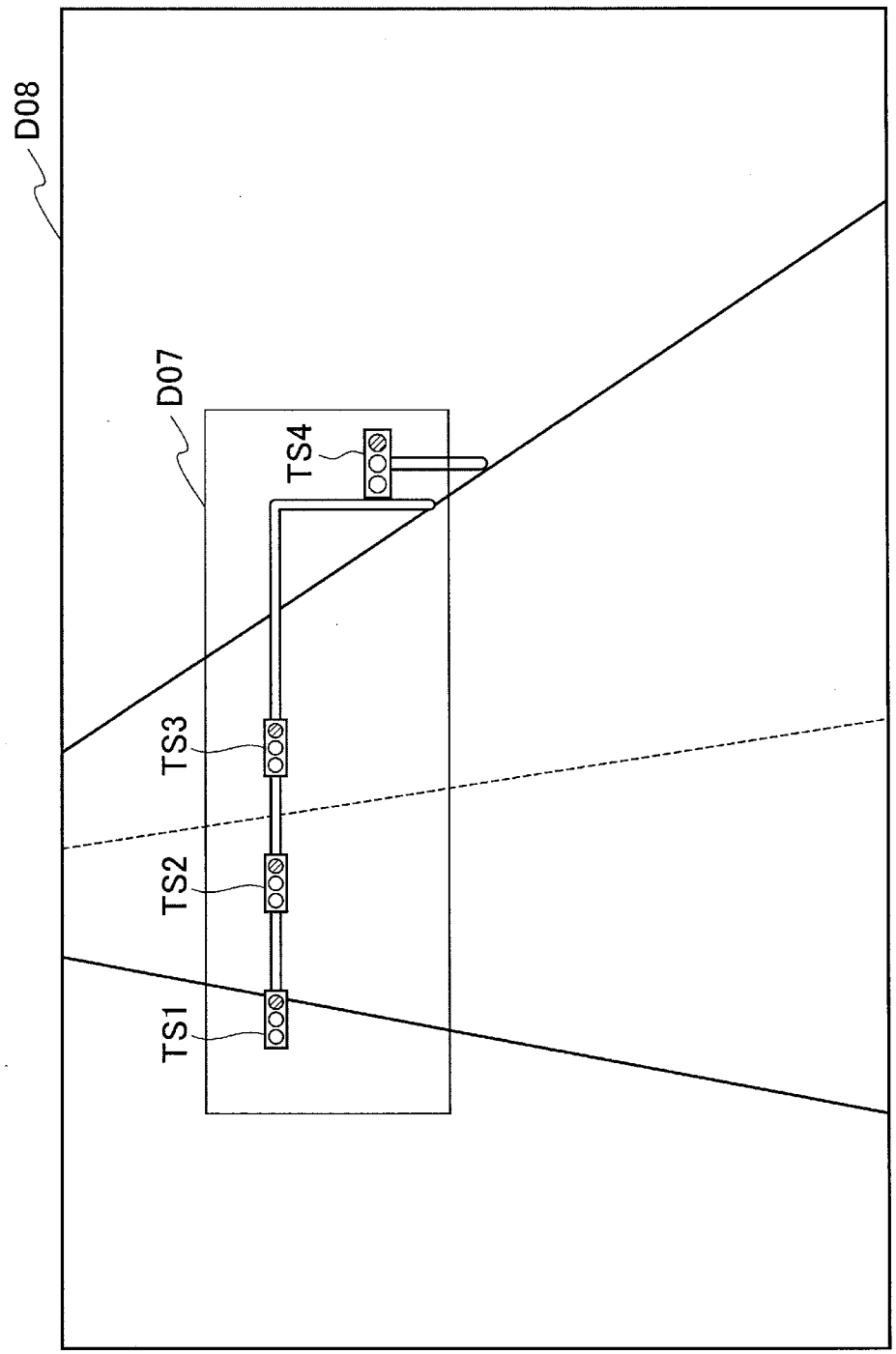
FIG. 3 is an explanatory diagram of a region where a narrow-angle camera and a wide-angle camera can detect a traffic signal, a deceleration start region, and a switchable region.

As shown in FIG. 3, assuming that the distance from the vehicle 5 to the traffic signal is X, the region where the narrow-angle camera 11 can detect a traffic signal is marked by the right-downward diagonal hatching, and in a region where traffic signals T1 and T2 are located, is a region of N21<X<N1 at a distance in the longitudinal direction of the vehicle. Moreover, a region where the wide-angle camera 12 can detect a traffic signal is marked by the left-downward diagonal hatching, and in the region where traffic signals T2 and T3 are located, is a region of W2<X<W1 at a distance in the longitudinal direction of the vehicle. Note that the vehicle width direction of the vehicle indicates a region to not deviate from the angle of view in the horizontal direction of the narrow-angle camera 11 and the wide-angle camera 12 and becomes narrower as a distance in the longitudinal direction of the vehicle is shorter.

N1 and W1 are distances in which rates of the detection of traffic signals by the narrow-angle camera 11 and the wide-angle camera 12 exceed a predetermined threshold, and are predetermined values set on the basis of a distance in which a traffic signal can be detected from the respective images, respectively. The distance region where a rate of detection of traffic signals by the narrow-angle camera 11 exceeds a predetermined threshold is X<N1, and a distance region in which a rate of detection of traffic signals by the wide-angle camera 12 exceeds the predetermined threshold is X<W1. N2 and W2 are predetermined values set on the basis of a position of the vehicle in the longitudinal direction of positions in which a traffic signal deviates from the angle of view of the narrow-angle camera 11 and the wide-angle camera 12. A region where a traffic signal deviates from the angle of view of the narrow-angle camera 11 is X<N2 in the longitudinal direction of the vehicle, while a region where a traffic signal deviates from the angle of view of the wide-angle camera 12 is X<W2 in the longitudinal direction of the vehicle. Since N2<W1, a region where both the narrow-angle camera 11 and the wide-angle camera 12 can detect a traffic signal is N2<X<W1 in the longitudinal direction of the vehicle in a region where the traffic signal T2 is located. The detectable region calculator 21 outputs N2<X<W1 as the detectable region information D01.

Figure 4:
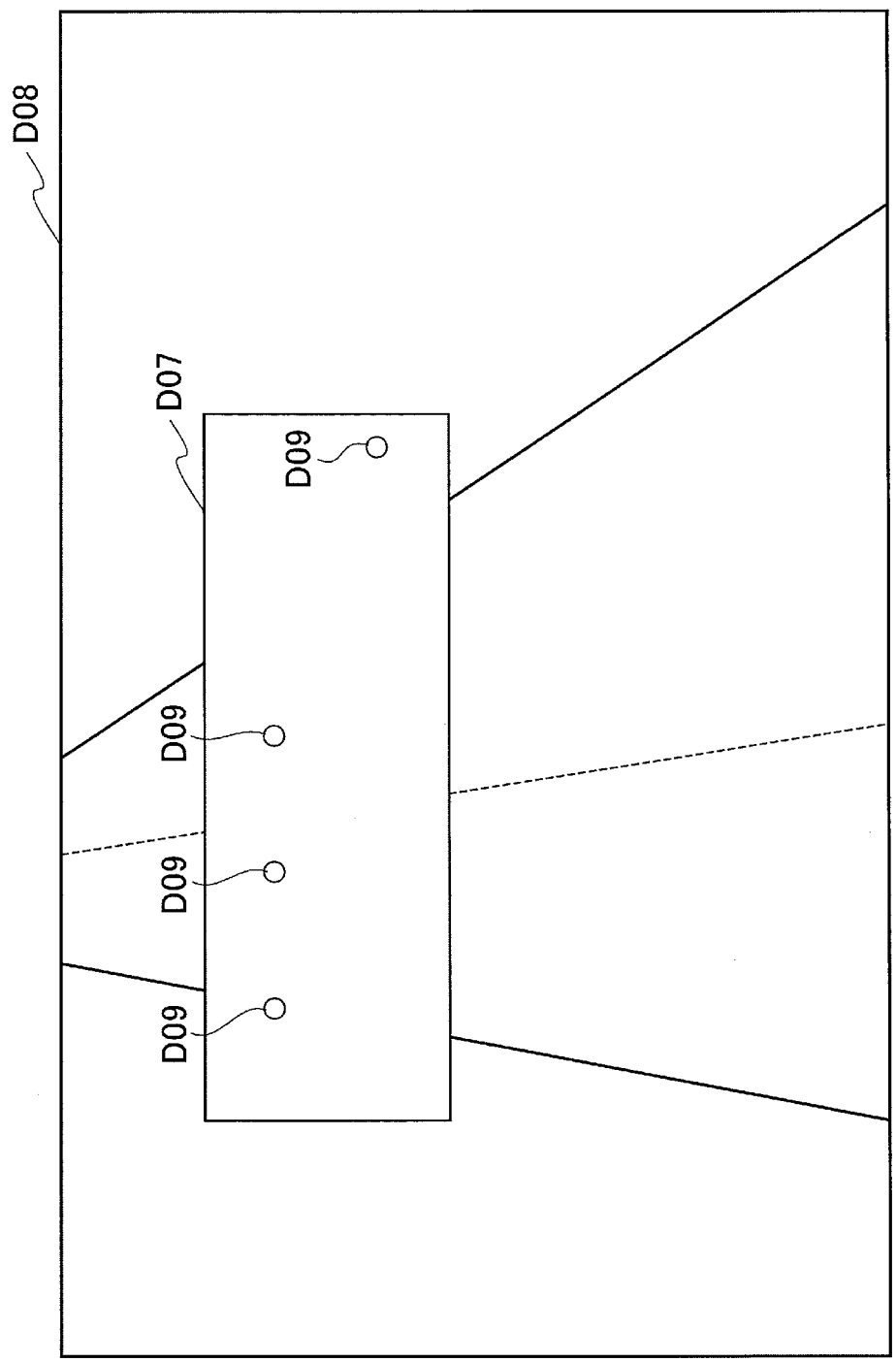
FIG. 4(a) to FIG. 4(c) are explanatory diagrams of angle-of-view region of the narrow-angle camera and the wide-angle camera.

FIGS. 4(a) to 4(c) are diagrams showing images, with a traffic signal captured in the forward direction from the vehicle 5, acquired from the narrow-angle camera 11 and the wide-angle camera 12. FIGS. 4(a) to 4(c) show states where the traffic signals T1 to T3 of FIG. 3 are located, respectively. The range of the angle of view of the narrow-angle camera 11 is situated inside the range of the angle of view of the wide-angle camera 12. FIG. 4(a) shows the traffic signal T1 located in a region where the traffic signal T1 can be detected only by the narrow-angle camera 11. A distance region where a rate of detection of the traffic signal by the wide-angle camera 12 is equal to or smaller than a predetermined threshold is X≥W1. FIG. 4(b) shows the traffic signal T2 located in a region where both the narrow-angle camera 11 and the wide-angle camera 12 can detect the traffic signal. FIG. 4(c) shows the traffic signal T2 located in a region where the traffic signal T2 can be detected only by the wide-angle camera 12. A region where the traffic signal deviates from the angle of view of the narrow-angle camera 11 is X<N2.

On the basis of target deceleration Dr which is a target deceleration at the time of decelerating the vehicle 5, and the speed information Dv, the deceleration start region calculator 22 calculates a deceleration start region in which the vehicle 5 should start deceleration in order to stop the vehicle 5 at a stop position for each traffic signal, and outputs the deceleration start region as deceleration start region information D02. The target deceleration Dr may be a range of the target deceleration.

Assuming that a range of the deceleration indicated by the target deceleration Dr is $a_0$ to $a_1$ ($a_0 < a_1$), speed of the vehicle 5 indicated by the speed information Dv is v, and a distance from the traffic signal to a stop line of the traffic signal is α, a distance in the longitudinal direction from the vehicle in the deceleration start region can be expressed by Formula (1).

$$v^2/(2 \times a_0) - \alpha \sim v^2/(2 \times a_1) - \alpha \qquad (1)$$

In the example shown in FIG. 3, C1 corresponds to $v^2/(2 \times a_1) - \alpha$, and C2 corresponds to $v^2/(2 \times a_0) - \alpha$. In other words, the deceleration start region information D02 means that, if deceleration is started while the distance X to the traffic signal is C2≤X≤C1, the vehicle 5 can stop at the stop position with the deceleration $a_0$ to $a_1$. The deceleration may be adjusted in magnitude and range ($a_0$ to $a_1$) in consideration of the ride comfort of a driver and the like.

On the basis of the detectable region information D01 and the deceleration start region information D02, the switchable region calculator 23 calculates a switchable region in which the image processor 3 can switch from the narrow-angle image to the wide-angle image so as not to overlap the timing at which the vehicle control starts deceleration, and outputs the switchable region as switchable region information D03. In the example shown in FIG. 3, a region indicated by the switchable region information D03 is a region obtained by excluding the deceleration start region information D02 from the detectable region information D01.

Assuming that the image processor 3 switches from the narrow-angle image to the wide-angle image when X is in the deceleration start region, the vehicle 5 may delay decision for stopping itself and require deceleration higher than the target deceleration Dr. The vehicle 5 determines whether or not to decelerate in order to stop at a position where X is in the switchable region and starts deceleration control, and thus can stop at a stop position for each traffic signal with deceleration in the target deceleration Dr.

On the basis of a predetermined delay time t when the image processor 3 switches a narrow-angle image used for detection of a traffic signal to a wide-angle image and speed v of the vehicle 5 indicated by the speed information Dv, the delay distance calculator 24 calculates a delay distance for the vehicle 5 to move for the delay time t, and outputs the delay distance as delay distance information D04. The t may be set in advance. In the example shown in FIG. 3, assuming that the vehicle 5 moves at speed v until X becomes D2 from D1 for the delay time t, the delay distance |D1-D2| is vt.

The switch region determiner 25 determines, on the basis of the switchable region information D03 and the delay distance information D04, a switch region indicating a region in which the image processor 3 switches from the narrow-angle image to the wide-angle image, and outputs the switch region as switch region information D05.

The switch region determiner 25 determines a region in which the delay distance falls into the switchable region as a switch region. Moreover, the switch region is determined so that a traffic signal detected from the narrow-angle image with high resolution capability can be a detection result as long as possible, even if a delay distance is generated when the traffic signal is located in the switchable region. In other words, the switch region determiner 25 determines a region in which the delay distance |D1-D2| is close to N2 and falls into the switchable region (N2<X<W1 excluding C2<X<C12) as a switch region.

Figure 5:
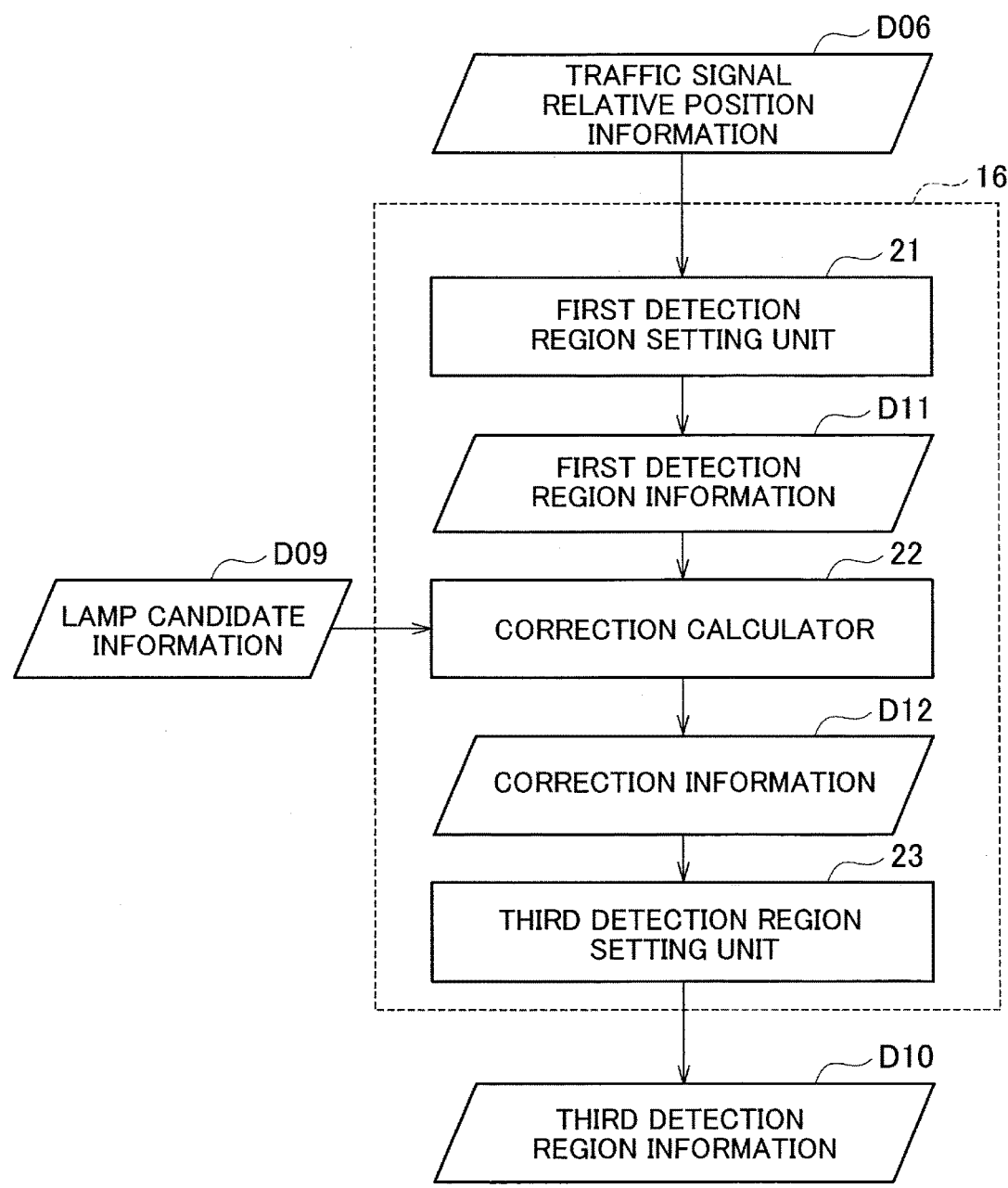
FIG. 5 is an explanatory diagram of a region where the narrow-angle camera and the wide-angle camera can detect a traffic signal, a deceleration start region, and a switchable region (W1 side)

In the example shown in FIG. 5, since the delay distance does not fall into the N2 side from the deceleration start region, the region (E2≤X≤E1) indicated by the switch region information D05 is determined to be a region as close as possible to C1 of the region on the W1 side. Note that E1 and E2 correspond to D1 and D2. In other words, when the traffic signal passes through E1, the image processor 3 switches from the narrow-angle image to the wide-angle image to detect the traffic signal. It is possible to switch from the narrow-angle image to the wide-angle image before the traffic signal enters the deceleration start region, and to switch the detection result of the traffic signal by preventing effects on the vehicle control. Moreover, in the example shown in FIG. 6, since the delay distance fits between C2 and N2, the region (E2≤X≤E1) indicated by the switch region information D05 is determined to be a region as close as possible to N2. The image processor 3 can detect a traffic signal with a narrow-angle image of the narrow-angle camera 11 until the traffic signal passes through the deceleration start region. Longer use of the narrow-angle image with high resolution while switching the detection result of a traffic signal with preventing effects on the vehicle control allows higher precision detection of the traffic signal over a longer time.

On the basis of the switchable region information D03, traffic signal's relative position information Dp, selection camera historical information Dh and the speed information Dv, the camera determiner 26 outputs the selection camera information Ds indicating which of the narrow-angle camera 11 and the wide-angle camera 12 is used for detecting the traffic signal. The selection camera historical information Dh indicates a camera that has captured an image used for detecting a previous traffic signal and the detection result of the previous traffic signal. The selection camera information Ds designates, to the image processor 3, which of a traffic signal detected from the narrow-angle image and a traffic signal detected from the wide-angle image is to be output as the traffic signal information Dt.

The relative position information Dp indicates a relative position of each traffic signal with respect to the vehicle 5. The relative position information Dp is estimated from map information including road shapes and positions of traffic signals, and positional information of the vehicle 5. The positional information of the vehicle 5 is acquired from a positioning device such as a Global Positioning System (GPS) receiver, an acceleration sensor mounted in the vehicle 5, the steer-angle sensor and the vehicle speed sensor 10. Note that, a traffic signal indicating the relative position information Dp is a traffic signal which presents a signal to the vehicle 5, in other words, a traffic signal which the vehicle should follow.

(Operation of Camera Determiner)

Figure 7:
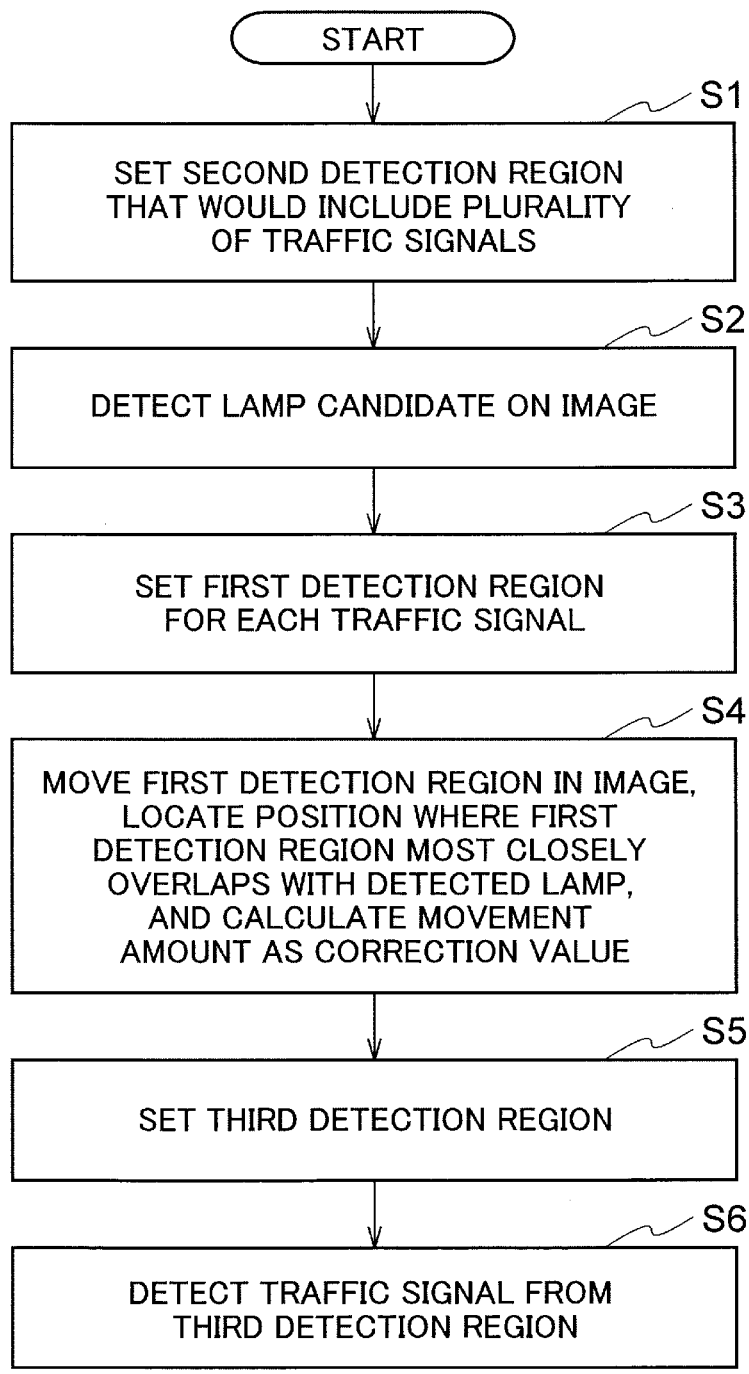
FIG. 7 is a flowchart illustrating an exemplary traffic signal detection method by the traffic signal detection device according to an embodiment of the present invention.
Figure 8:
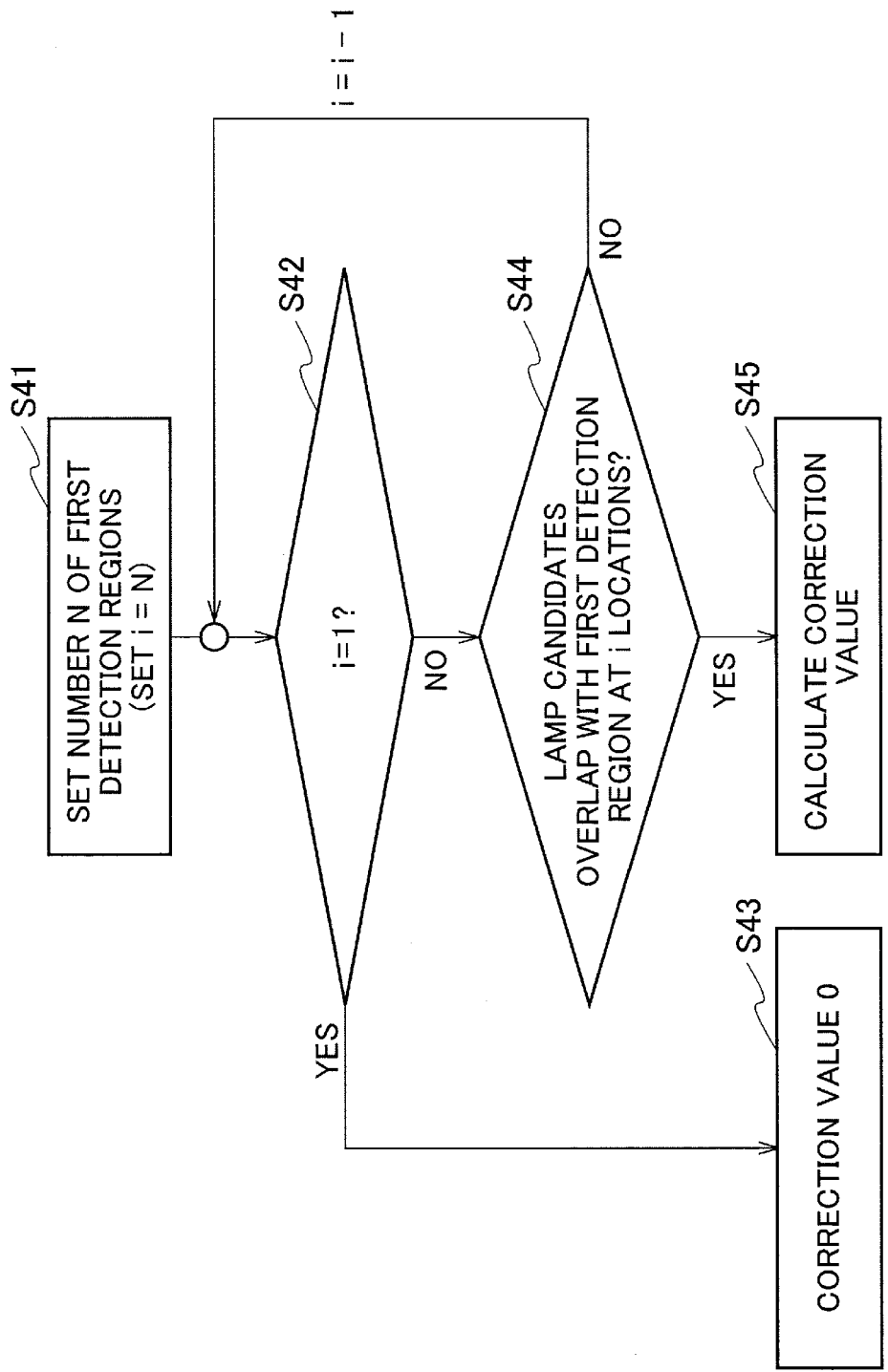
Figure 10:
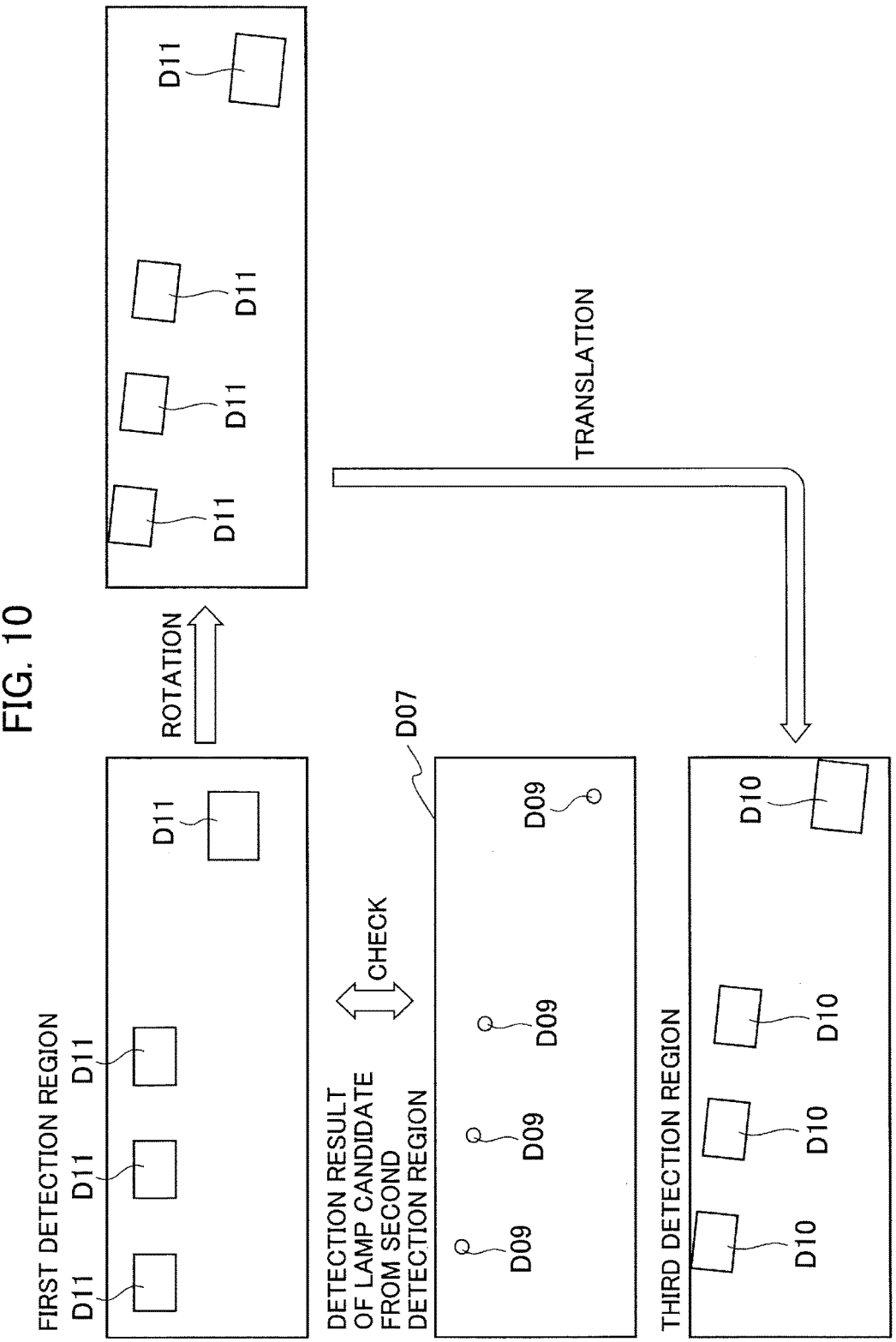
Figure 12:
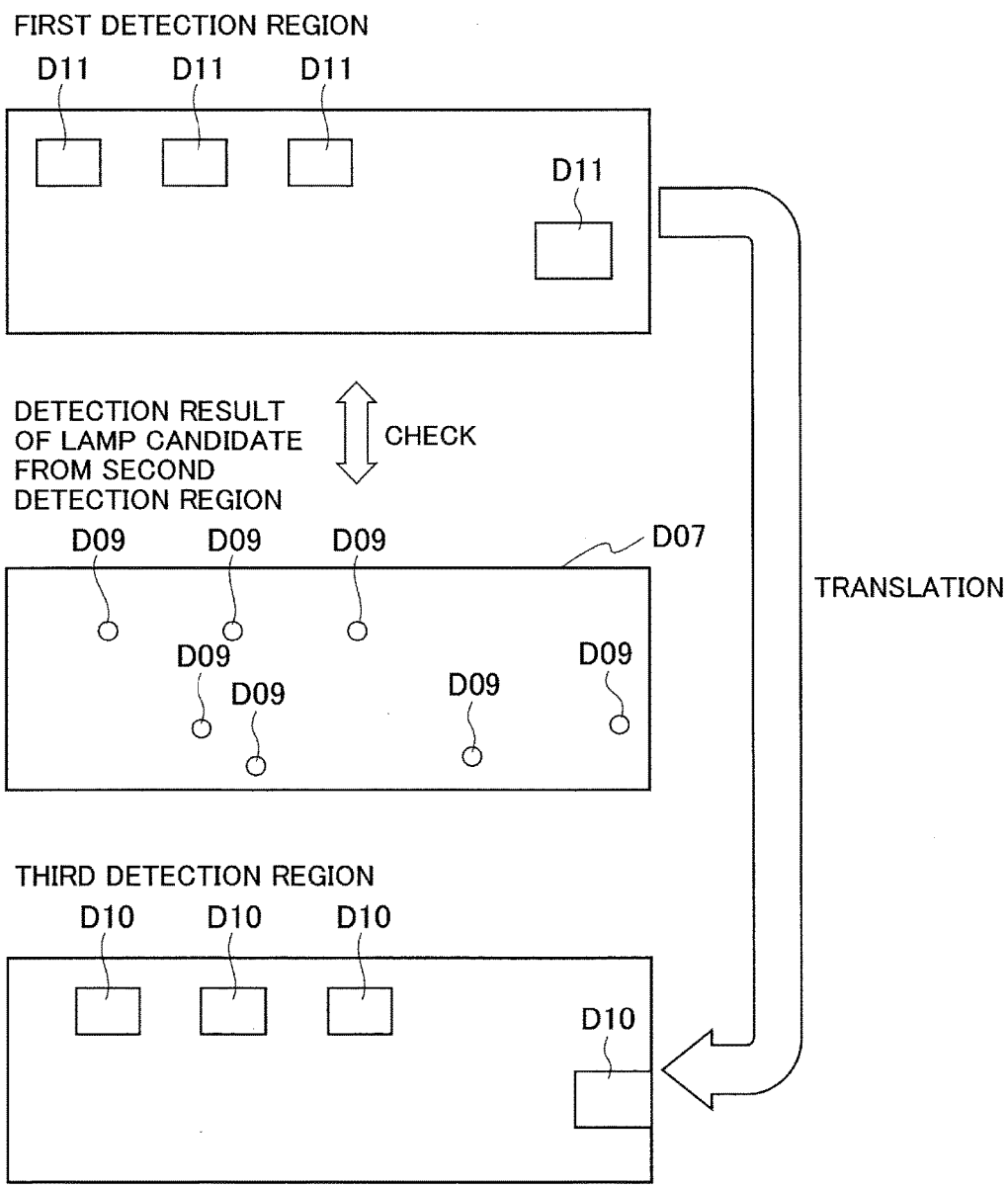
Figure 14:
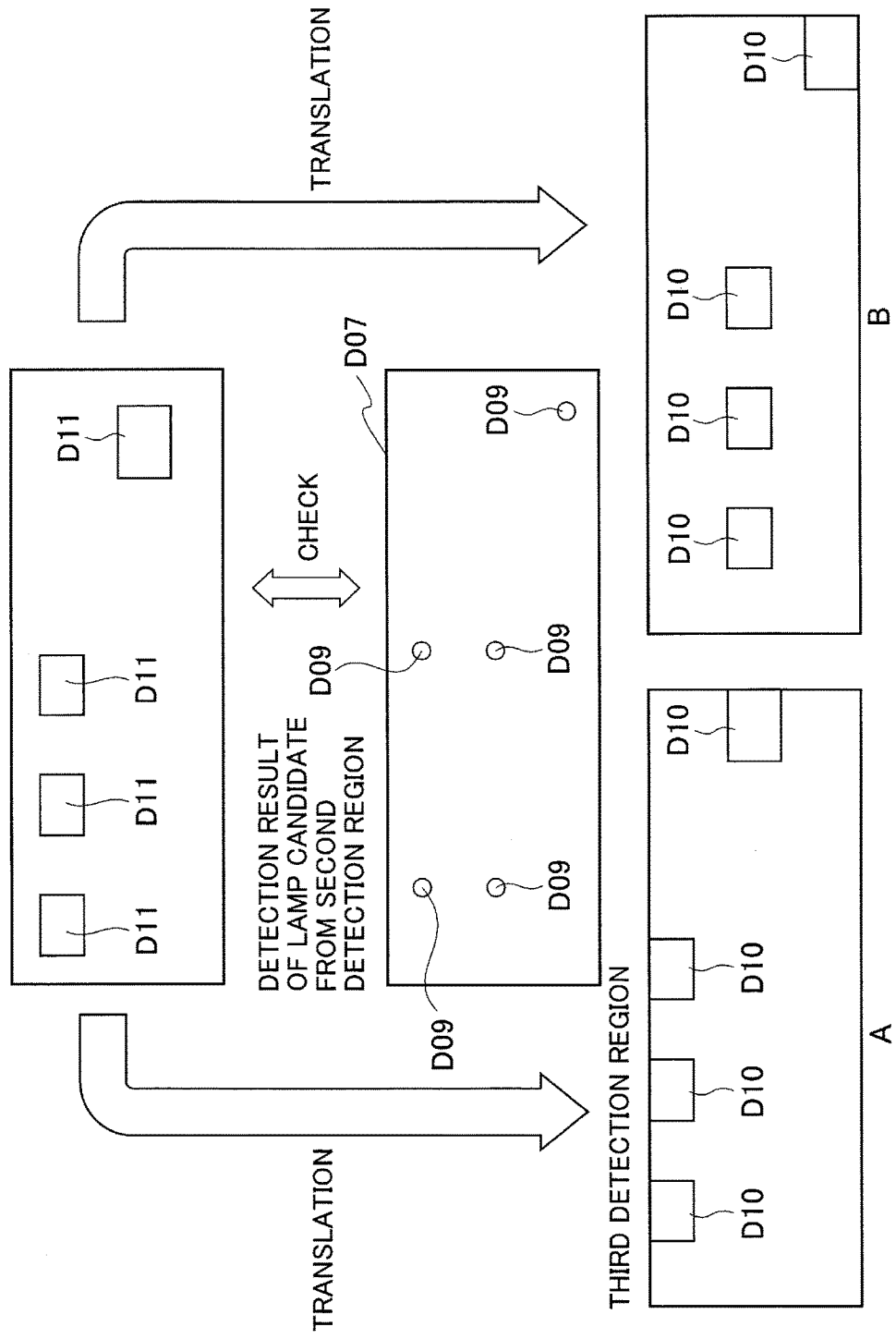
Figure 15:
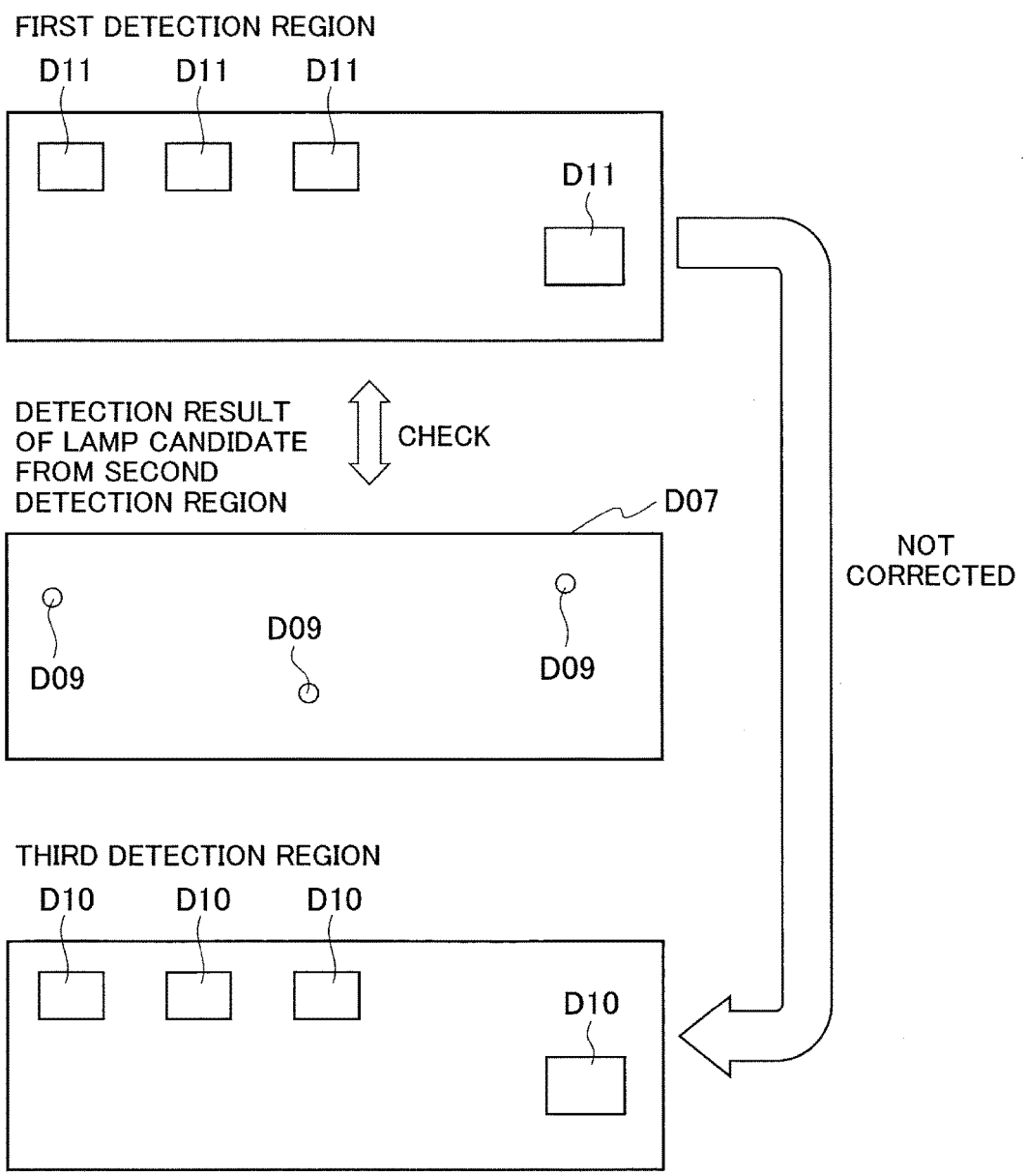
Figure 16:
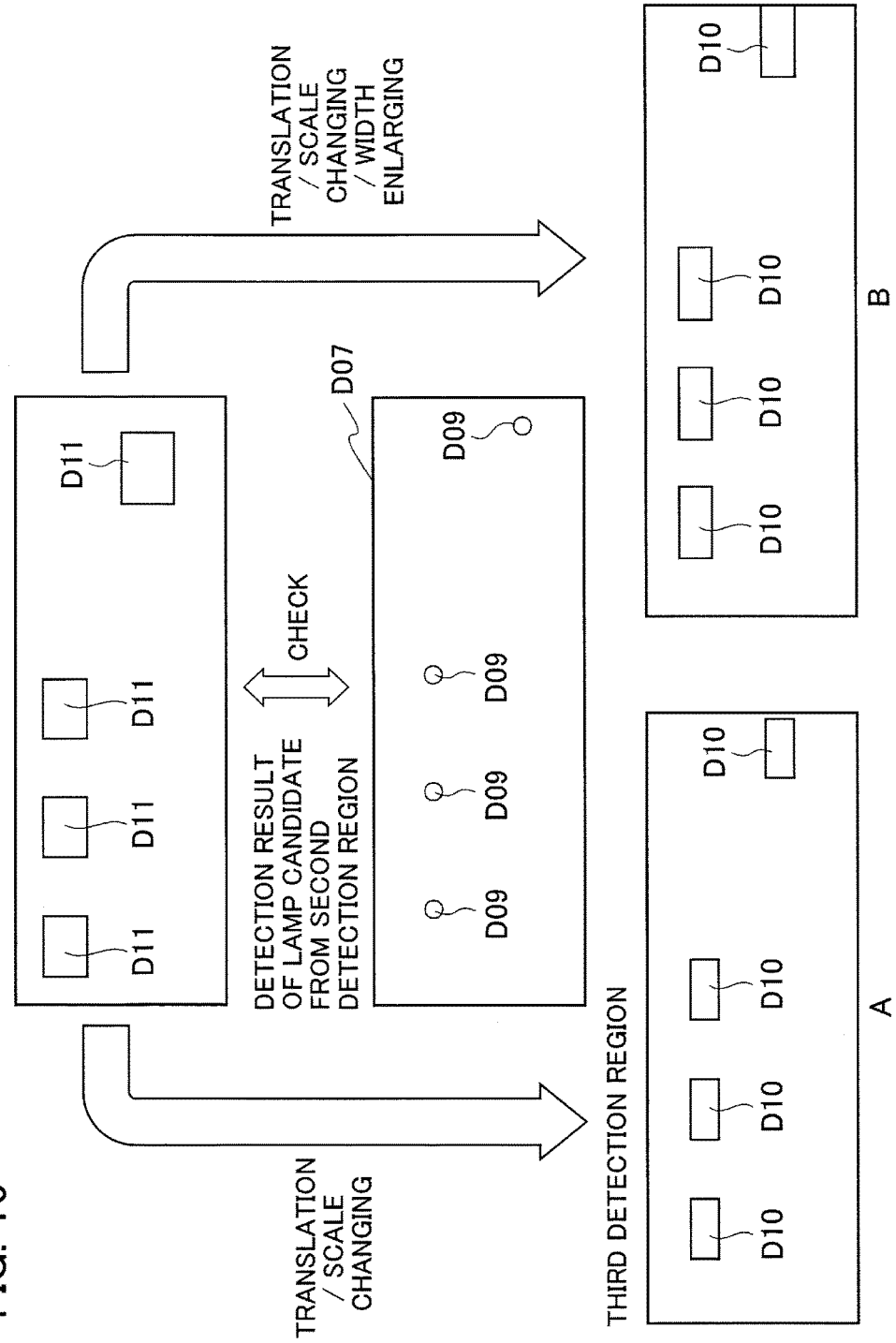

Hereinbelow, with reference to the flowchart of FIG. 7, an exemplary traffic signal detection method by the traffic signal detection device according to the present embodiment will be described. The following process is performed, by the camera determiner 26, for each traffic signal that presents a signal to the vehicle 5.

In Step S1, the camera determiner 26 determines whether or not the position of a traffic signal is in a region where the narrow-angle camera 11 can detect the traffic signal. In other words, it is determined whether or not the distance X from the vehicle 5 to the traffic signal is equal to or greater than N2 calculated by the detectable region calculator 21, and the traffic signal is in a region where the traffic signal does not deviate from the angle of view in the horizontal direction of the narrow-angle camera 11. When the position of the traffic signal is in a region where the narrow-angle camera 11 can detect the traffic signal, the camera determiner 26 sets the process proceeding to Step S2, and selects the wide-angle camera 12 in Step S7 when the position of the traffic signal is not in a region where the narrow-angle camera 11 can detect the traffic signal, since the narrow-angle image cannot detect the traffic signal.

In Step S2, the camera determiner 26 determines whether or not the position of the traffic signal is in a region where the wide-angle camera 12 can detect the traffic signal. Note that, since the angle of view in the horizontal direction of the wide-angle camera 12 is wider than the angle of view in the horizontal direction of the narrow-angle camera 11, in Step S2, the traffic signal is in a region where the traffic signal does not deviate from the angle of view of the horizontal direction of the wide-angle camera 12. In other words, it is determined whether or not the distance X from the vehicle 5 to the traffic signal is equal to or smaller than W1 calculated by the detectable region calculator 21. When the vehicle 5 is running straight toward the traffic signal, the camera determiner 26 will determine whether or not a traffic signal detected from the narrow-angle image of the narrow-angle camera 11 by the image processor 3 enters a region where the wide-angle camera 12 can detect the traffic signal. The camera determiner 26 sets the process proceeding to Step S3, when the position of the traffic signal is in a region where the wide-angle camera 12 can detect the traffic signal, and selects the narrow-angle camera 11 in Step S8 when the position of the traffic signal is not in a region where the wide-angle camera 12 can detect the traffic signal, since the traffic signal cannot be detected from the wide-angle image.

In Step S3, the camera determiner 26 determines whether or not the traffic signal detected by the image processor 3 is a green light. The camera determiner 26 sets the process proceeding to Step S4 when the traffic signal is not a green light. The camera determiner 26 sets the process proceeding to Step S5, when the traffic signal is a green light.

In Step S4, the camera determiner 26 determines whether or not the position of the traffic signal passes through the deceleration start region. In other words, it is determined whether or not the distance X from the vehicle 5 to the traffic signal enters the region of $X \leq C1$ calculated by the deceleration start region calculator 22. When the position of the traffic signal does not pass through the deceleration start region, the process goes to Step S5. When the traffic signal is not a green light, or the traffic signal was not detected, and when the position of the traffic signal passes through the deceleration start region, the camera determiner 26 selects the wide-angle camera 12 in Step S9 since the vehicle 5 has already started deceleration, and even if a delay occurs in switching images to detect the traffic signal, when the traffic signal changed to the green light, or the green light is detected, the timing of stopping the deceleration control of the vehicle is only delayed and there is little influence. As a result, the camera determiner 26 can prevent a delay due to switching of detection results while the traffic signal is a green light.

In Step S5, the camera determiner 26 determines whether or not the detection result of the previous traffic signal from the selection camera historical information Dh is from the narrow-angle camera 11. The camera determiner 26 sets the process proceeding to Step S7, when the narrow-angle camera 11 is selected in the previous process. The camera determiner 26 sets the process proceeding to Step S6, when the wide-angle camera 12 is selected in the previous process.

In Step S6, the camera determiner 26 determines, for the previous process, whether or not the vehicle 5 passes through the intersection (traffic signal), on the basis of the position of the intersection (traffic signal) estimated from positional information of the vehicle 5, etc. When the camera determiner 26 determines that the vehicle 5 passes through the intersection (traffic signal), the process goes to Step S7. When the camera determiner 26 determines that the vehicle 5 does not pass through the intersection (traffic signal), the process goes to Step S9, in order to minimize the switching of detection results, the wide-angle camera 12 is continuously selected until it is determined that the vehicle 5 passes through the intersection (traffic signal).

In Step S7, the camera determiner 26 determines whether or not the position of the detected traffic signal is in a switch region determined by the switch region determiner 25 on the basis of the switch region information D05. In other words, it is determined whether or not the distance X from the vehicle 5 to the traffic signal is $E2 \leq X - E1$. The camera determiner 26 selects the wide-angle camera 12 in Step S9 when the position of the traffic signal is in the switch region. The camera determiner 26 continuously selects the narrow-angle camera 11 in Step S8 when the position of the traffic signal is not in the switch region.

The camera determiner 26 generates the selection camera information Ds to designate, to the image processor 3, to output the traffic signal detected from the image of the camera selected in Step S8 or Step S9 as the traffic signal information Dt, and output it to the image processor 3.

With the traffic signal detection device according to the present embodiment, while the traffic signal is located in the switch region determined to avoid the deceleration start region, the detection result is switched from the traffic signal detected from the narrow-angle image to the traffic signal detected from the wide-angle image. As a result, the traffic signal detection device according to the present embodiment can suppress the effects on the vehicle control, switch the detection result of the traffic signal, and perform smooth deceleration control of the vehicle 5.

Moreover, with the traffic signal detection device according to the present embodiment, the switch region is set on the basis of a distance in which the traffic signal deviates from the angle of view of the narrow-angle camera 11, so that the detection result by the narrow-angle camera 11 with high resolution capability can be selected for a long time. Accordingly, the traffic signal detection device according to the present embodiment can improve the detection accuracy of traffic signals.

Moreover, with the traffic signal detection device according to an embodiment of the present invention, a detection result is switched to that with the wide-angle camera 12 on the basis of a distance in which a traffic signal deviates from the angle of view of the narrow-angle camera 11 when the detected traffic signal is a green light. As a result, the traffic signal detection device according to the present embodiment can select the detection result by the narrow-angle camera 11 with high resolution capability for a long time and improve the detection accuracy of a traffic signal.

Moreover, with the traffic signal detection device according to the present embodiment, the switch region is set on the basis of a distance in which a traffic signal can be detected from a wide-angle image, so that the detection result with the narrow-angle camera 11 can be continuously selected in a position in which the detection accuracy with the wide-angle camera 12 is low. Accordingly, the traffic signal detection device according to the present embodiment can select the detection result by the narrow-angle camera 11 with high resolution capability for a long time and improve the detection accuracy of a traffic signal.

Moreover, with the traffic signal detection device according to the present embodiment, when the detected traffic signal is not a green light, or the traffic signal cannot be detected, and when the detected traffic signal passes through the deceleration start region, since the vehicle 5 has already started deceleration, a traffic signal detected from the wide-angle image is selected as a detection result. As a result, the traffic signal detection device according to the present embodiment can prevent delay due to the switching of the detection result while the traffic signal is a green light.

Moreover, with the traffic signal detection device according to the present embodiment, when a detection result by the wide-angle camera 12 is selected, the wide-angle camera 12 is continuously selected until the vehicle 5 passes through the intersection. As a result, the traffic signal detection device according to the present embodiment can reduce unnecessary switching of detection results and minimize switching of detection results.

OTHER EMBODIMENTS

Although the present invention has been described by the embodiments as described above, one should not understand that the statements and the drawings as part of the disclosure limit the present invention. From this disclosure, various modified embodiments, examples and operation techniques will be apparent to those who skilled in the art.

Figure 6:
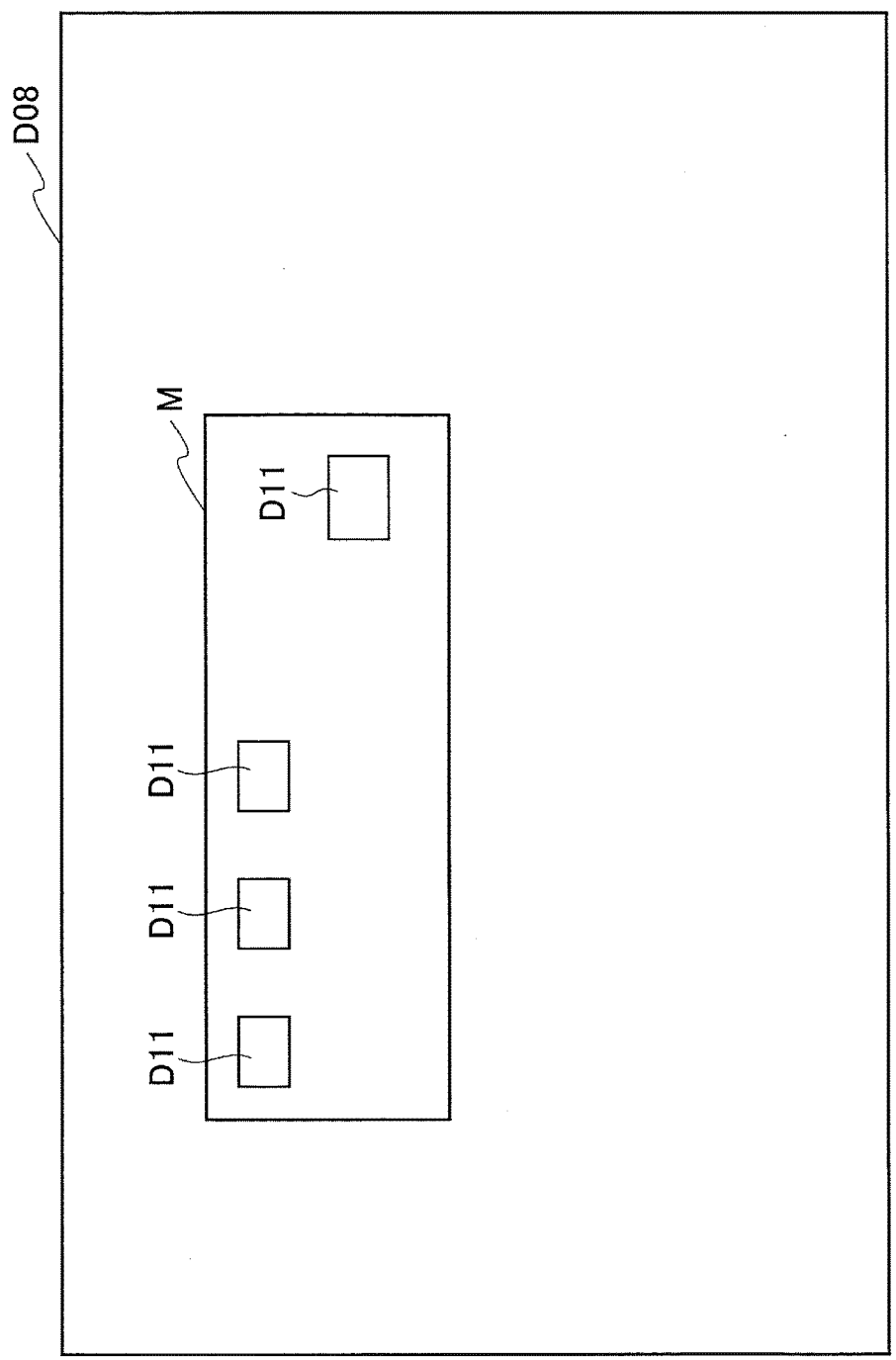
FIG. 6 is an explanatory diagram of a region where the narrow-angle camera and the wide-angle camera can detect a traffic signal, a deceleration start region, and a switchable region (N2 side)

For example, in the embodiments described above, the processes of Step S3 and Step S4 in the flowchart of FIG. 6 may be performed in reverse order. Alternatively, the present invention, of course, includes various embodiments not described in this description, such as each configuration mutually applied. Therefore, the technical scope of the present invention is defined only by the appropriate features according to the scope of claims in view of the explanations made above.

According to the present invention, a traffic signal detection device and a traffic signal detection method can be provided which can reduce effects on the vehicle control due to switching by performing switching of detection results in consideration of a deceleration start region in which the vehicle should start deceleration.

REFERENCE SIGNS LIST 4 traffic signal detector
5 vehicle
10 vehicle speed sensor
11 narrow-angle camera
12 wide-angle camera

The invention claimed is:

1. A traffic signal detection device comprising:
a camera configured to capture an image of surroundings of a mobile object;
a self-position detector configured to detect a self-position of the mobile object;
a traffic signal position estimation unit configured to estimate a relative position of a traffic signal with respect to the mobile object on the basis of map information including positional information of the traffic signal that is present on the surroundings of the mobile object, and the self-position;
a first detection region setting unit configured to set a first detection region on the image for each traffic signal predicted to be present on the image from the relative position of the traffic signal;
a second detection region setting unit configure to set, when it is predicted that a plurality of traffic signals is present on the image, a second detection region including a region of the plurality of predicted traffic signals on the image;
a third detection region setting unit configured to set a third detection region for each of the plurality of traffic signals by correcting a position of the first detection region to cause the position of the first detection region to correspond to a lamp candidate of the plurality of traffic signals detected from the second detection region; and
a traffic signal detector configured to detect traffic signals from the third detection region.

2. The traffic signal detection device according to claim 1, wherein the third detection region setting unit sets the third detection region whose scale with respect to the entire image is equal to the first detection region.

3. The traffic signal detection device according to claim 1, wherein the third detection region setting unit sets the third detection region whose area is smaller than that of the first detection region.

4. The traffic signal detection device according to claim 1, wherein the traffic signal detector detects a traffic signal from the first detection region when the number of the lamp candidates detected from the second detection region is one.

5. The traffic signal detection device according to claim 1, wherein the traffic signal detector detects a traffic signal from the first detection region when the number of the first detection regions corresponding to the lamp candidates is one on the image.

6. The traffic signal detection device according to claim 1, wherein the third detection region setting unit sets a third detection region by correcting the first detection region to a position in which the first detection region most closely corresponds to the lamp candidates on the image.

7. A traffic signal detection method, comprising:
estimating a relative position of a traffic signal with respect to a mobile object on the basis of map information including positional information of the traffic signal that is present on surroundings of the mobile object and a self-position of the mobile object;
setting a first detection region on an image captured by a camera for each traffic signal predicted to be present on the image of surroundings of the mobile object, from the relative position of the traffic signal;
setting, when it is predicted that a plurality of traffic signals is present on the image, a second detection region including a region of the plurality of predicted traffic signals on the image;
setting a third detection region for each of the plurality of traffic signals by correcting a position of the first detection region to cause the position of the first detection region to correspond to a lamp candidate of the plurality of traffic signals detected from the second detection region; and
detecting traffic signals from the third detection region.

* * * * *